March 2, 1926.

J. O. BARRETT

FEED MECHANISM FOR FACING MACHINES

Filed March 13, 1922   4 Sheets-Sheet 2

1,575,522

Inventor
James O. Barrett
By
Attorney

March 2, 1926.
J. O. BARRETT
1,575,522
FEED MECHANISM FOR FACING MACHINES
Filed March 13, 1922    4 Sheets-Sheet 3
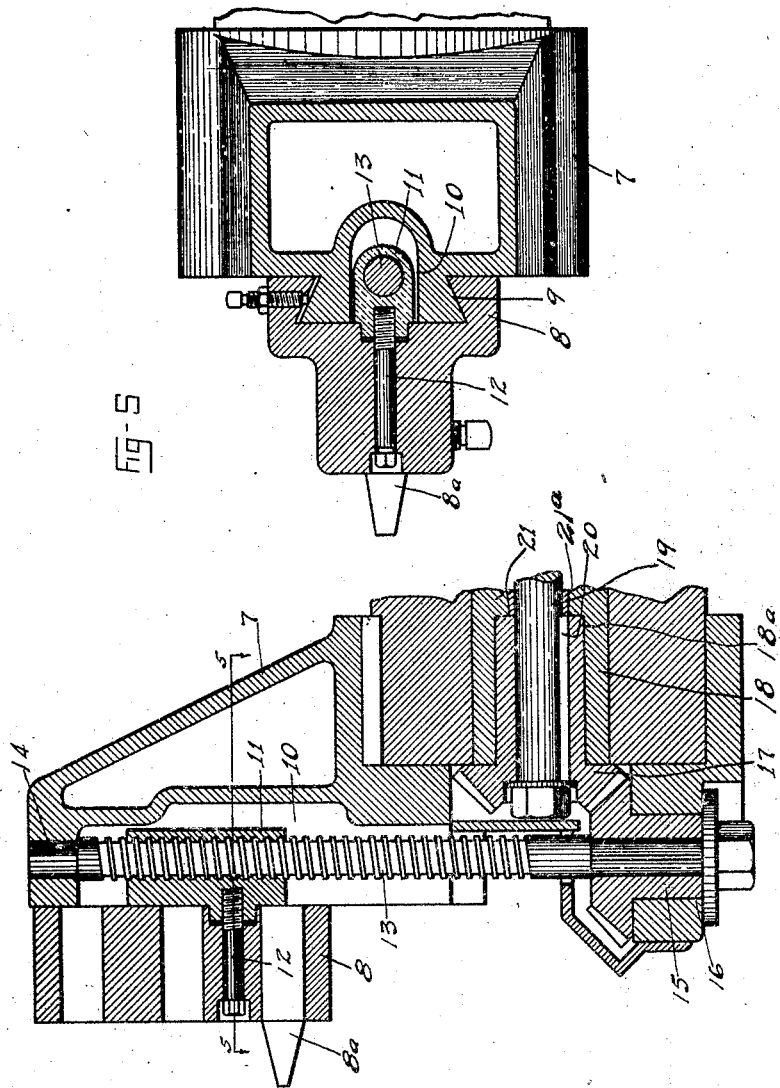
Inventor
James O. Barrett
By
Attorney

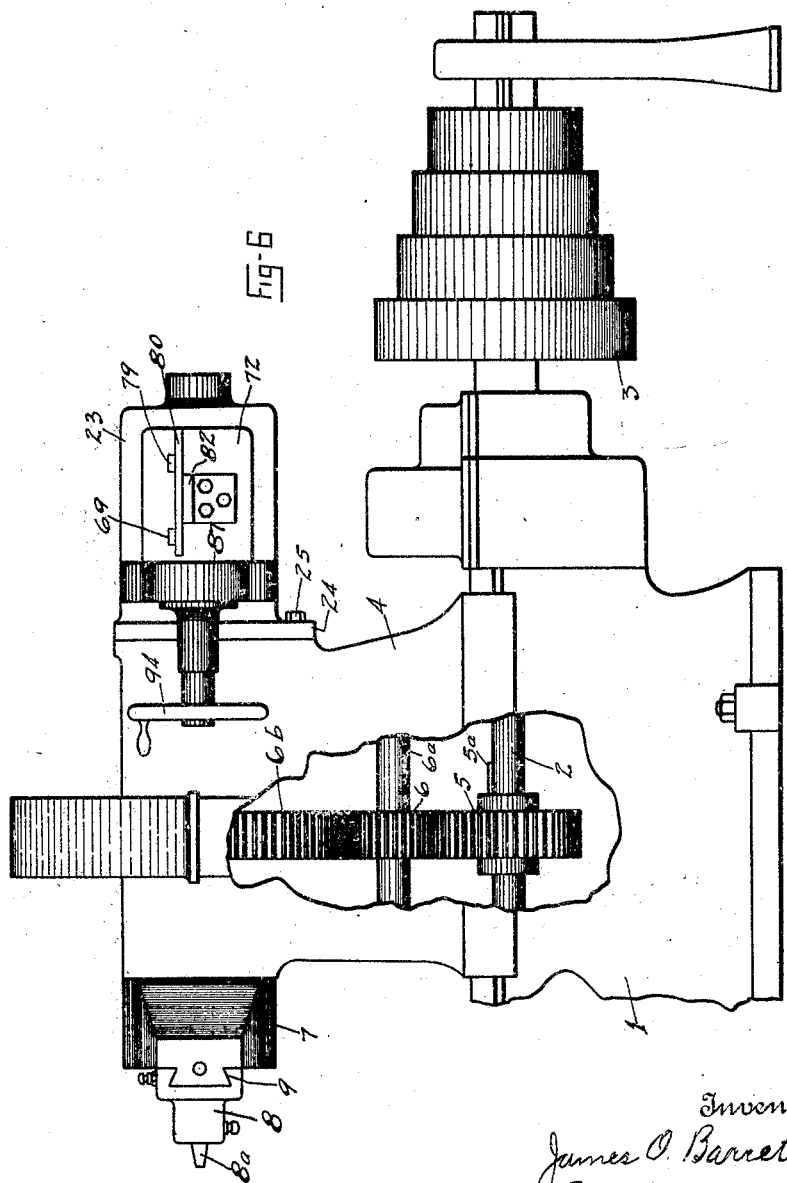

Patented Mar. 2, 1926.

1,575,522

UNITED STATES PATENT OFFICE.

JAMES O. BARRETT, OF MEADVILLE, PENNSYLVANIA.

FEED MECHANISM FOR FACING MACHINES.

Application filed March 13, 1922. Serial No. 543,219.

*To all whom it may concern:*

Be it known that I, JAMES O. BARRETT, a citizen of the United States, residing at Meadville, in the county of Crawford and State of Pennsylvania, have invented new and useful Improvements in Feed Mechanism for Facing Machines, of which the following is a specification.

This invention is designed to simplify and make more efficient the feeding mechanism for facing machines. In carrying out the invention I provide a variable speed changing mechanism for changing the speed of the feed shaft relatively to the tool carrying spindle. Preferably this is arranged concentrically with the axis of the spindle and operates upon the feed shaft in the spindle. I also prefer to provide means whereby the driving connection to the feed shaft may be broken and the feed shaft handled manually to return or move the tool to a new position for a new cut. Details of the invention will appear from the specification and claims.

The invention is illustrated in the accompanying drawings as follows:—

Figure 1:
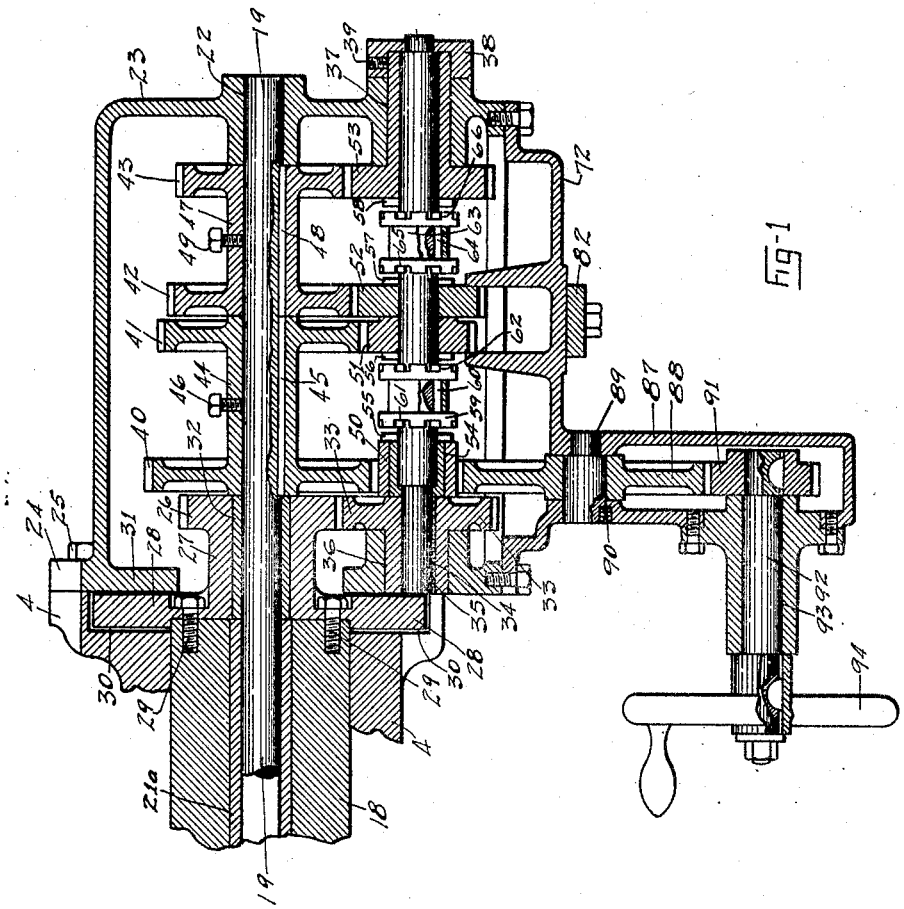
Figure 2:
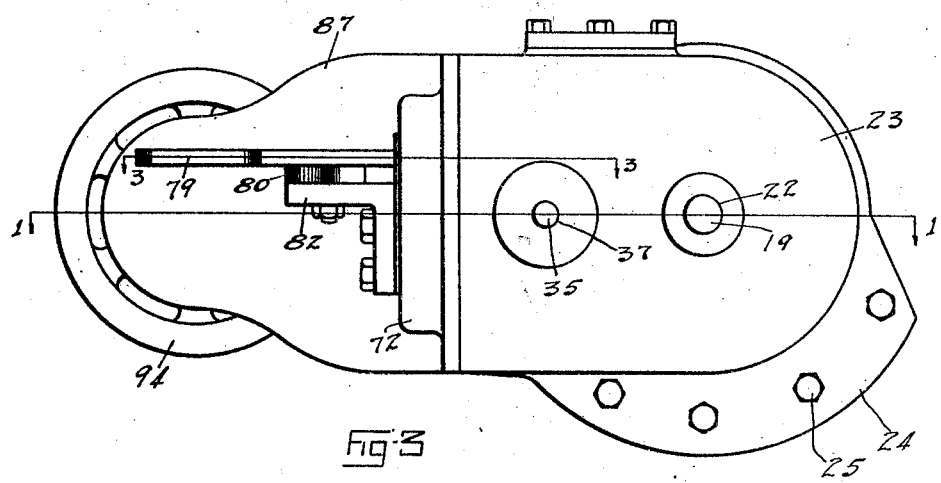

Fig. 1 is a section on the line 1—1 in Fig. 2.

Fig. 2 an end view of the speed changing mechanism.

Figure 3:
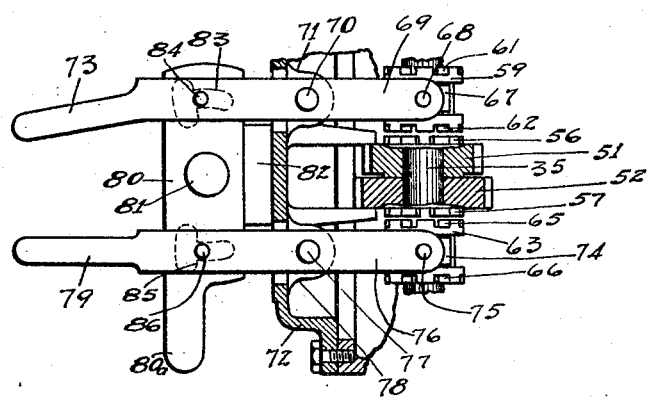

Fig. 3 a section on the line 3—3 in Fig. 2.

Fig. 4 a central section through the facing arm.

Fig. 5 a section on the line 5—5 in Fig. 4.

Fig. 6 a front elevation of the facing machine, a part being broken away to better show construction.

1 marks the bed of the machine, 2 the drive shaft, and 3 a drive pulley, although it will be understood that different driving mechanisms may be used. A spindle head 4 is slidingly mounted on the base 1. A gear 5 is mounted on the shaft 2 and locked thereon by a spline 5ª, this gear sliding with the head 4. The gear 5 meshes with an intermediate gear 6 mounted on a shaft 6ª and the intermediate gear 6 meshes with a gear 6ᵇ on the spindle.

The facing arm 7 has the usual tool block 8 slidingly mounted on the ways 9. A tool 8ª is secured in the tool block in any desired manner. The arm 7 has a groove 10 in its face. A nut 11 is secured on the block 8 by means of a bolt 12 and extends into the groove 10. A feed screw 13 operates in the nut 11. The screw is journaled at its outer end in a bearing 14 and is secured at its lower end in a gear 15, the gear being journaled in a bearing 16 in the lower end of the arm. The gear 15 meshes with a gear 17 journaled in a bearing 18ª in the end of a spindle 18. The gear 17 is locked on a feed shaft 19 by means of a key 20. The feed shaft extends through an opening forming a bearing 21 extending through the center of the spindle 18, a bushing 21ª being provided to improve the bearing. The general construction of the facing arm is not new at the present time.

The feed shaft 19 extends into a bearing 22 in the outer end of a speed changing mechanism housing or box 23. The box is provided with a flange 24 and screws 25 extend through this flange into the outer wall of the head 4. A gear 26 has a hub 27. A flange 28 extends outwardly from the hub. Screws 29 extend through the flange into the end of the spindle and thereby secure the gear 26 to the spindle. The flange 28 is arranged in a recess 30 in the face of the head 4 and a flange 31 extends inwardly from the housing or box 23 over the flange, thus locking the spindle in place in its bearing. A bushing 32 is provided for the gear 26 improving the bearing of the gear 26 on the shaft 19. The gear 26 meshes with a gear 33. The gear 33 is locked by a key 34 with an auxiliary shaft 35. The gear 33 has a hub which extends into a bearing 36 and thus forms the bearing for the shaft 35. The opposite end of the shaft 35 extends into a bearing 37 arranged in the wall of the housing 23, a hub of a gear hereinafter described being arranged on the shaft in the bearing and a cap 38 is secured to this hub by means of a set screw 39, thus locking the parts in place. A series of gears 40, 41, 42, and 43 of differing diameters are locked with the shaft 19. The gears 40 and 41 are secured on the same hub or sleeve 44 and this is locked with the shaft 19 by a key 45, a set screw 46 being provided to better secure the gears. The gears 42 and 43 are mounted on a sleeve or hub 47 and are locked with the shaft 19 by a key 48, a set screw 49 being provided to better secure the sleeve on the shaft.

The gears 40, 41, 42 and 43 mesh with gears 50, 51, 52 and 53 respectively on the shaft 35, the speed transmitted from the spindle through the gears 26 and 33 and gear 50 and 40 being the low speed and the other gears stepping the speed up, the high speed being through the gears 53 and 43.

A bushing 54 is provided as a bearing for the gear 50. This gear has the jaws 55 on its face and the gear 51 has jaws 56 on its face. The gears 52 and 53 have jaws 57 and 58 respectively on their opposing faces. A sliding clutch element 59 is mounted on the shaft 35 and locked therewith by means of a spline 60. The opposite face of the element 59 has the jaws 61 and 62 adapted to engage the jaws 55 and 56 respectively. A clutch element 63 is slidingly mounted on the shaft 35 between the detents 57 and 58. It is locked with the shaft 35 by a spline 64 and is provided with the jaws 65 and 66 locking with the jaws 57 and 58 respectively. A block 67 is arranged in the element 59 and this is secured by a pin 68 with a shift lever 69. The shift lever is mounted on a pin 70 extending from an ear 71 on a cover plate 72 of the box 23. The lever 69 is provided with a handle 73. A block 74 is arranged in the element 63 and is connected by a pin 75 with a lever 76. The lever 76 is pivoted on a pin 77. The pin 77 is mounted on an ear 78 on the cover plate 72. The lever 76 is provided with a handle 79. A locking lever 80 is mounted on a pin 81 extending from an ear 82 on the plate 72. The lever is provided with an angle or key-shaped slot 83 into which the pin 84 on the lever 69 extends. It is provided also with a similar slot 85 into which the pin 86 on the lever 76 extends. The lever 80 is provided with a handle 80ᵃ. With the lever in the neutral position as shown in Fig. 3 both the levers 69 and 76 are locked in a neutral position holding the elements 59 and 63 in the central position and with the jaws out of engagement. When it is desired to throw any of the gears into driving relation the lever 80 is swung to release one lever continuing its locking action on the other. For instance if it is desired to swing the lever 69 the lever 80 is swung to bring the pin 84 into the part of the slot 83 extending lengthwise of the lever 80. This movement simply moves the pin 86 farther into the cross portion of the slot 85. With the lever 80 so positioned the lever 69 may be swung in either direction to throw either the gear 50 or 51 into operative, or driving relation. By swinging the lever 80 in the opposite direction the lever 69 may be locked in the neutral position and the pins 86 being brought into the lengthwise portion of the slot 85 so that the lever 76 may be swung to bring either the gear 52 or 53 into driving relation. This locking device is necessary because it prevents the locking in of two different speeds at the same time.

It is desirable to provide the device with a conveniently arranged manually operated drive for the feeding device so as to return the tool, or move it to a new position. This can ordinarily be done so much more readily with a hand-operated device that it is much more desirable than to attempt to do it through the driving mechanism and it also makes it more convenient to set the tool at the desired point. An extension 87 is provided on the cover plate 72. A gear 88 is journaled on a shaft 89, the shaft being locked in the extension 87 by a screw 90. The gear 88 meshes with the gear 50 and with a gear 91. The gear 91 is fixed on a shaft 92. The shaft 92 is journaled in a bearing 93 carried by the extension 87. A hand wheel 94 is fixed on the end of the shaft 93. By turning the hand wheel the motion thereon is transmitted by way of the gears 91, 88, and 50 to the gear 40 on the feed shaft. Furthermore this gives the desired rapidity of movement to the feed shaft so that the cutting tool may be brought readily to the position desired.

It will be observed that as the spindle is rotated giving to the arm its rotation the motion of the spindle is carried to the gear 26 and through the speed changing device may be carried to the feed shaft with the speed desired, the feed shaft communicating its movement to the tool block through the gears and screw as described. The mechanism is particularly desirable because it may be attached directly to the end of the head and in alinement with the spindle, thus occupying a convenient position on the machine and communicating the movement direct to the feed shaft. It also simplifies the mounting and arrangement of the manually operated feeding mechanism.

What I claim as new is:—

1. In a mechanism of the class described, the combination of two parallel shafts; a series of sets of gears on said shafts of differing speed ratios; means for throwing different gear sets into operative relation comprising two shift levers acting on different sets; and a locking lever arranged across the shift levers, said shift levers and locking lever having pin and slot connections permitting the shifting of one shift lever at a time.

2. In a mechanism of the class described, the combination of two parallel shafts; a series of sets of gears on said shafts of differing speed ratios; means for throwing different gear sets into operative relation comprising two shift levers for acting on different sets; a locking lever extending across the shift levers and having a slot with lengthwise and crosswise parts therein; and pins on the shift levers extending into said slots, the locking lever throwing the pin of one shift lever into a cross slot as the pin of the other shift lever is brought into a lengthwise slot to permit it to move to shifting position.

In testimony whereof I have hereunto set my hand.

JAMES O. BARRETT.